United States Patent
Hutchin et al.

(10) Patent No.: US 6,924,899 B2
(45) Date of Patent: Aug. 2, 2005

(54) SYSTEM FOR MEASURING WAVEFRONT TILT IN OPTICAL SYSTEMS AND METHOD OF CALIBRATING WAVEFRONT SENSORS

(75) Inventors: Richard A. Hutchin, Malibu, CA (US); Oberdan W. Otto, Camarillo, CA (US)

(73) Assignee: Optical Physics Company, Calabasas, CA (US)

( * ) Notice: Subject to any disclaimer, the term of this patent is extended or adjusted under 35 U.S.C. 154(b) by 405 days.

(21) Appl. No.: 10/158,974

(22) Filed: May 31, 2002

(65) Prior Publication Data

US 2003/0222196 A1 Dec. 4, 2003

(51) Int. Cl.$^7$ ................................................ G01B 9/02
(52) U.S. Cl. ................................ 356/521; 250/201.9
(58) Field of Search ................................ 356/521, 450, 356/512, 520; 250/201.9

(56) References Cited

U.S. PATENT DOCUMENTS

| 4,413,909 A | * 11/1983 | Pohle .......................... 356/521 |
| 4,518,854 A | * 5/1985 | Hutchin ....................... 356/521 |
| 6,498,650 B1 | 12/2002 | Davies |
| 6,548,797 B1 | * 4/2003 | Ai ............................ 250/201.9 |
| 6,587,215 B2 | 7/2003 | Davies |

OTHER PUBLICATIONS

Hardy, John W., *Adaptive Optics For Astronomical Telescopes*, Oxford University Press, 1998, pp. 135–175.

* cited by examiner

Primary Examiner—Andrew H. Lee
(74) Attorney, Agent, or Firm—Fulbright & Jaworski L.L.P.

(57) ABSTRACT

A wavefront tilt measurement system for measuring the wavefront tilt of light passing through transmitting or receiving optical systems, the optical systems including a primary aperture and internal optical elements defining an optical system focal plane. A light source emits light at the optical system focal plane towards the internal optical elements such that light from the light source emerges from the primary aperture. A plurality of tilt sensors are disposed adjacent to the primary aperture to receive light emerging from the primary aperture. Each tilt sensor includes a sensor focal plane and a plurality of detector elements. Each tilt sensor generates at the focal plane a plurality of overlapping regions of zero and first order images of light emerging from the primary aperture. The measured intensity of light in the overlapping regions is used to determine the wavefront tilt of light emerging from the primary aperture.

22 Claims, 7 Drawing Sheets

SYSTEM FOR MEASURING WAVEFRONT TILT IN OPTICAL SYSTEMS AND METHOD OF CALIBRATING WAVEFRONT SENSORS

BACKGROUND OF THE INVENTION

1. Field of the Invention

The field of the present invention is test equipment for optical systems. More specifically, the invention provides a system for measuring wavefront tilt in optical systems and a method of calibrating wavefront sensors.

2. Background

Presently, large optical systems exist that have apertures of approximately 1 meter or more in diameter. In the future, space based telescopes and laser beam directors are expected to have apertures in the range of 5 to 10 meters or more. Large wavefront sensors are and will be required to measure the static and/or dynamic aberrations of such large optical systems. Testing systems are especially important for space based optical systems, as careful testing on the ground before launch may greatly reducing the risk of poor performance once the optical system is in orbit. In order to test such optical systems, a wavefront sensor that is at least equal in size to the aperture of the optical system is needed. The wavefront sensor measures the wavefront tilt of light emerging from the optical system. Tilt in the wavefront of light emerging from the optical system is indicative of optical aberrations in the optical system. Once detected, the aberrations may be corrected through the addition of corrective optics, or the optical elements causing the aberrations may be replaced. Large wavefront sensors, however, are expensive and time consuming to construct.

SUMMARY OF THE INVENTION

The present invention is directed to a system and method for measuring wavefront tilt in transmitting or receiving optical systems and a method of calibrating wavefront tilt sensors. The optical systems receive or transmit light through a primary aperture and include internal optical elements that define a focal plane of the optical system. The wavefront tilt measurement system comprises a light source emitting light at the focal plane of the optical system, such that light from the light source emerges from the primary aperture, and a plurality of tilt sensors forming subapertures. The tilt sensors are disposed adjacent to the primary aperture of the optical system to receive light emerging from the primary aperture. Each tilt sensor is additionally disposed adjacent to at least one other tilt sensor. The tilt sensors enable wavefront tilt measurements of light emerging from the primary aperture of optical systems.

In a first separate aspect of the present invention, each tilt sensor comprises a primary lens disposed to receive light emerging from the primary aperture, a reimaging lens optically coupled to the primary lens, and a grating optically disposed between the primary lens and the reimaging lens. The combination of the primary lens and the reimaging lens defines a focal plane of the tilt sensor. Light emerging from the primary aperture that is received by the primary lens is focused onto the grating. The grating generates a plurality of overlapping regions of zero and first order images of light at the focal plane of the tilt sensor. The overlapping zero and first order images create fringe patterns within the overlapping regions. Each tilt sensor further includes a plurality of detector elements, and each detector element is disposed within one of the overlapping regions at the focal plane of the tilt sensor. The detector elements measure the power of light and the fringe pattern within each overlapping region. The tilt of that portion of the wavefront emerging from the primary aperture and entering each subaperture may be determined using the measurements of the detector elements.

In a second separate aspect of the present invention, the measurement system also includes one or more coarse position sensors. Each coarse position sensor is optically coupled to one of the tilt sensors such that the coarse position sensor receives light entering the tilt sensor from the primary aperture. The coarse position sensors may also be used to determine the wavefront tilt of light entering the subaperture. Depending upon the optical system, ambiguities may arise in the wavefront tilt measurements of the tilt sensor. The wavefront tilt measurement of the coarse position sensor, when considered in combination with the wavefront tilt measurement of the tilt sensor, may be used to remove the ambiguities from the wavefront tilt measurement of the tilt sensor.

In a third separate aspect of the present invention, a method of calibrating the boresight for a wavefront sensor comprises illuminating sets of adjacent subapertures to obtain dual axis correction data through comparison of the measurements obtained from adjacent subapertures. Well known wavefront reconstruction processes are then applied to the correction data to obtain the boresight error over the entire wavefront sensor. The correction data is employed to increase the accuracy of the wavefront tilt measurement of an optical system.

In a fourth separate embodiment of the present invention, any of the foregoing aspects may be employed in combination.

Accordingly, it is an object of the present invention to provide an improved system and method for measuring wavefront tilt in large optical systems. Other objects and advantages will appear hereinafter.

BRIEF DESCRIPTION OF THE DRAWINGS

In the drawings, wherein like reference numerals refer to similar components:

FIGS. 4a–4e are illustrated as a black and white photograph, wherein FIGS. 4a–4d are representations of image patterns of light as light propagates within the lateral shear interferometer of FIG. 2.

DETAILED DESCRIPTION OF THE PREFERRED EMBODIMENTS

Figure 1:
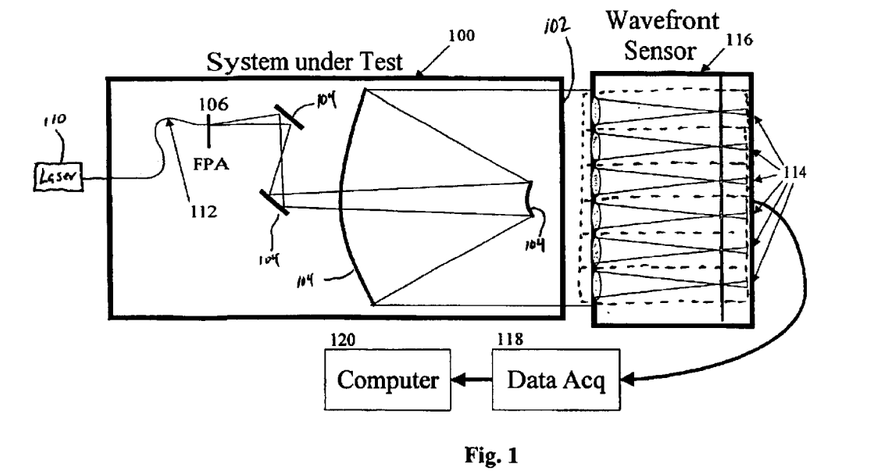
FIG. 1 is a schematic illustration of a system for measuring wavefront tilt in accordance with an embodiment of the present invention.

Turning in detail to the drawings, FIG. 1 illustrates a wavefront tilt measurement system disposed about an optical system 100. The optical system 100 may be a telescope, a laser beam director, or other similar light transmitting or receiving systems that are known in the art. Thus, the optical system 100 has a primary aperture 102 to transmit or receive light and includes internal optical elements 104 that define a focal plane 106 of the optical system 100.

The wavefront tilt measurement system comprises a laser 110 coupled to a fiber 112, such that the distal end of the fiber 112 emits light at the focal plane 106, and a plurality of tilt sensors 114 disposed adjacent to the primary aperture 102. The tilt sensors are lateral shear interferometers 114 in FIG. 1. Light emitted from the fiber 112 passes through the internal optical elements 104 and out of the optical system 100 through the primary aperture 102. The wavelength of light produced by the laser 110 is dependent upon the optical system 100 being tested and the construction of the lateral shear interferometers 114, as further described below. Alternative light sources may be substituted into the measuring system in place of the laser 110 and fiber 112. Where alternative light sources are employed, a light source which produces coherent light is preferred.

The lateral shear interferometers 114 are disposed within a housing 116 so that each lateral shear interferometer 114 forms a sub-aperture lying within a common plane that is approximately parallel to the plane formed by the primary aperture 102 of the optical system 100. The housing 116 facilitates positioning each sub-aperture adjacent to the primary aperture 102 and blocks light from external light sources to reduce or eliminate interference that may be caused by such external light sources. Interference due to external light sources may be nearly or completely eliminated by the combination of the housing 116, the proximity of the lateral shear interferometers 114 to the primary aperture 102, and the optical power of the light source. Each lateral shear interferometer 114 generates electronic signals that may be used to determine wavefront aberrations of light at the optical entrance of the respective sub-aperture. These electronic signals are read out, digitized, and stored as data in a data acquisition system 118. Thereafter, the data may be accessed by a computer 120 for processing and display. Processing of the data is further described below.

Figure 2:
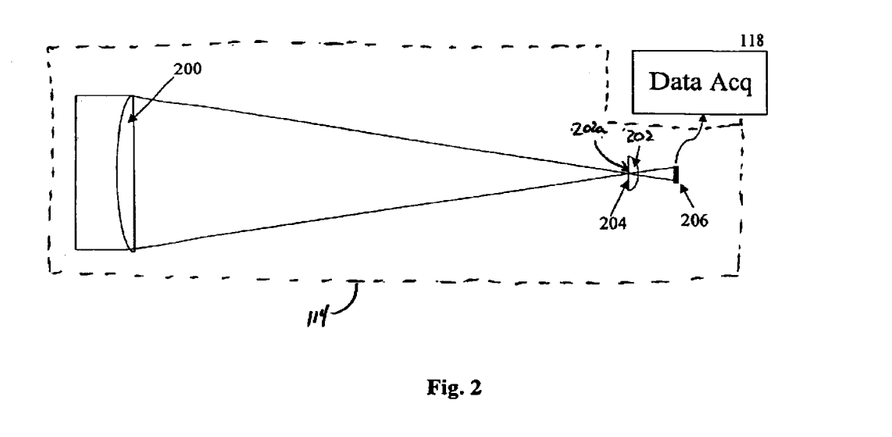
FIG. 2 is a schematic illustration a lateral shear interferometer used in the system of FIG. 1

The actual number of lateral shear interferometers 114 used depends upon the size of the primary aperture 102 and the size of each lateral shear interferometer 114. The lateral shear interferometers 114 are thus disposed to receive at least a portion of the wavefront of light from the laser 110 that passes through the primary aperture 102. FIG. 2 illustrates an embodiment of a lateral shear interferometer 114. The lateral shear interferometer (LSI) 114 comprises a focusing lens 200, a plano-convex lens 202, a grating 204 integral to the planar side 202a of the plano-convex lens, and a detector 206. The grating may optionally be non-integral to the plano-convex lens. The focusing lens 200 is disposed in the subaperture of the lateral shear interferometer 114 and focuses light from the light source onto the grating 204. The plano-convex lens 202 thereafter images the sub-aperture onto the detector 206. The resulting image convolves the original image with the Fourier transform of the grating 204 as is commonly taught in the theory of lateral shear interferometers. The detector 206 comprises a plurality of detector elements (shown in FIG. 5) which produce electronic signals that are read out by the data acquisition system 118.

Those skilled in the art will recognize that the plano-convex lens is acting as a reimaging lens. Thus, any appropriate lens may be used in place of the plano-convex lens, with the grating optionally integral or non-integral. However, integration of the grating with the plano-convex lens simplifies the optics of the lateral shear interferometer and the mathematics associated with the measurement system.

Figure 3A:
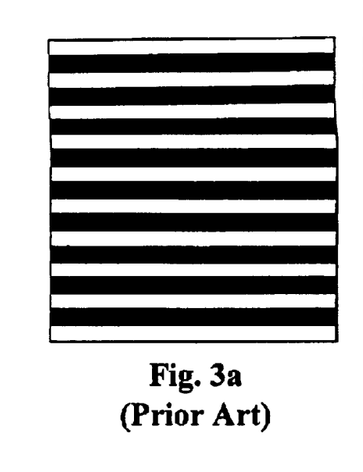
FIGS. 3a–3d illustrate grating patterns, wherein the grating patterns of FIGS. 3a–3c represent grating patterns used in lateral shear interferometers of the prior art and the grating pattern of FIG. 3d represents the grating pattern of the lateral shear interferometer of FIG. 2.
Figure 3B:
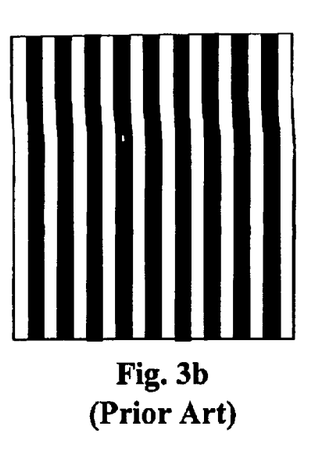
Figure 3C:
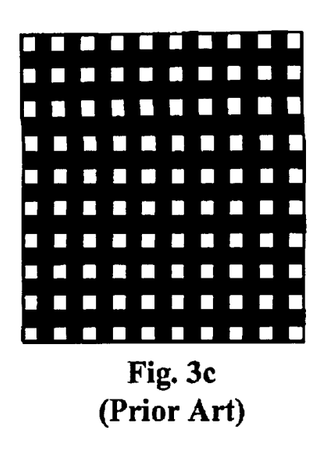
Figure 3D:
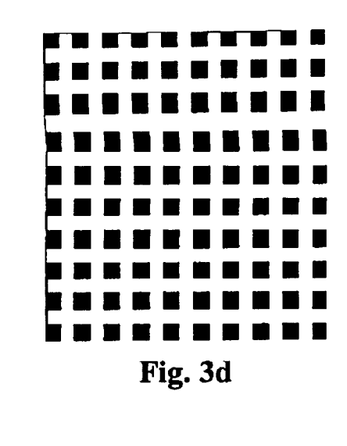

The grating 204 of the lateral shear interferometer 114 has an inverse crossed pattern as illustrated in FIG. 3d. This grating pattern has a 75% average transmission rate of incident light. Other grating patterns, such as the grating pattern illustrated in FIG. 3c, may also be used in the lateral shear interferometer.

The grating pattern of FIG. 3d can be represented as 1 minus the combination of a horizontal Ronchi grating, illustrated in FIG. 3a, and a vertical Ronchi grating, illustrated in FIG. 3b. The combination of the two Ronchi gratings is represented in FIG. 3c. Each Ronchi grating has an average transmission rate of 50%. The transmission of each Ronchi grating is a periodic square wave given by the following equations:

$T(x,y) = Sq(y/p)$ for the horizontal Ronchi grating, and $T(x,y) = Sq(x/p)$ for the vertical Ronchi grating, where $Sq(x)=1$ if $0<\mod(x,1)<\frac{1}{2}$, and $Sq(x)=0$ otherwise. The total transmission of the combination of the two Ronchi gratings is the product of the respective equations, given by $Sq(x/p)*Sq(y/p)$. This combination grating has a 25% average transmission rate. Thus, to achieve an average transmission rate of 75%, the inverse of the combination grating may be used. Such an inverse grating changes the zero order transmission without changing the higher order diffractive properties of the grating. The transmission of the grating represented by FIG. 3d is given by the following equation:

$T_{grating}(x,y) = 1 - Sq(x/p)*Sq(y/p)$.

Figure 4A:
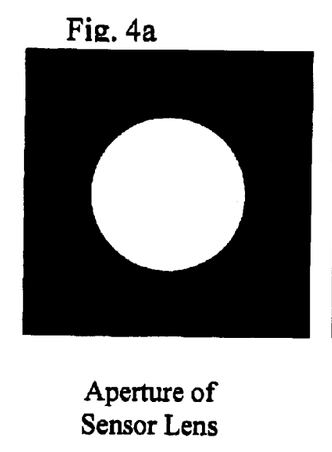
Figure 4B:
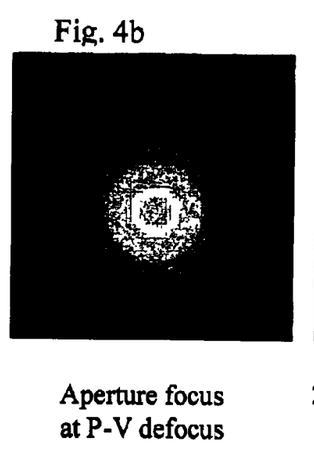
Figure 4C:
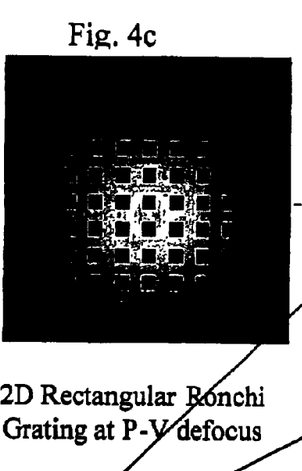
Figure 4D:
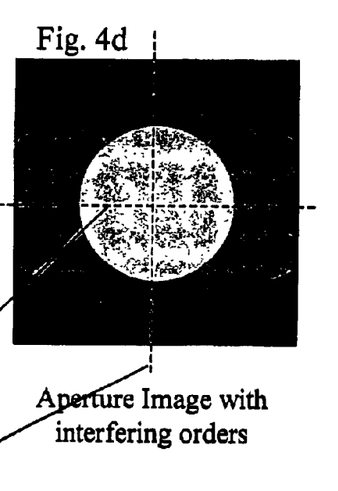

FIGS. 4a–4d illustrate the beam intensity patterns as light propagates within the lateral shearing interferometer 114 of FIG. 2. FIG. 4a illustrates the uniform intensity of light from the laser as it enters the primary lens 200. FIG. 4b illustrates the intensity of light focused down to a small spot just prior to the grating 204. FIG. 4c illustrates the intensity pattern of light just after transmitting through the grating where the inverse cross-hatched pattern has blocked regions of the light. FIG. 4d illustrates the intensity pattern of light at the detector plane which is disposed at an image plane of the primary lens 200 as created by the plano-convex lens 202.

The formula for the amplitude of each harmonic (j,k) of the Fourier transform of the grating is given by the following equations:

$Amp(j,k) = 0.75$ if $j=k=0$;

$Amp(j,k) = 1/(2\pi jk)$ if both $j$ and $k$ are odd;

$Amp(j,k) = 1/(2\pi j)$ if $j$ is odd and $k=0$;

$Amp(j,k) = 1/(2\pi k)$ if $k$ is odd and $j=0$; and $Amp(j,k) = 0$ for all other values of $j$ and $k$.

These amplitudes satisfy the conservation of energy principle since the sum of their squares is 0.75, which is the transmission rate of the inverse cross-hatched grating pattern. Each order gives a translated image of the uniformly illuminated pupil whose intensity is proportional to the square of the strength of the order. The intensity of the image for each order is the grating efficiency for that order. Thus, where the strength of the zero order image (j=k=0) is 0.75, the grating efficiency is 56.3% of light at the aperture of the lateral shear interferometer, and where the strength of the first order image a (j=k=1) is 1/(2π), the grating efficiency is 2.5%.

Figure 4E:
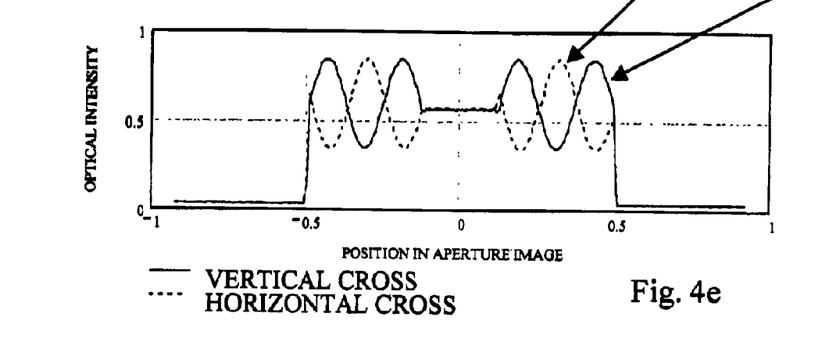
FIG. 4e is a graph illustrating the interference pattern of light created within the lateral shear interferometer of FIG. 2.
Figure 5:
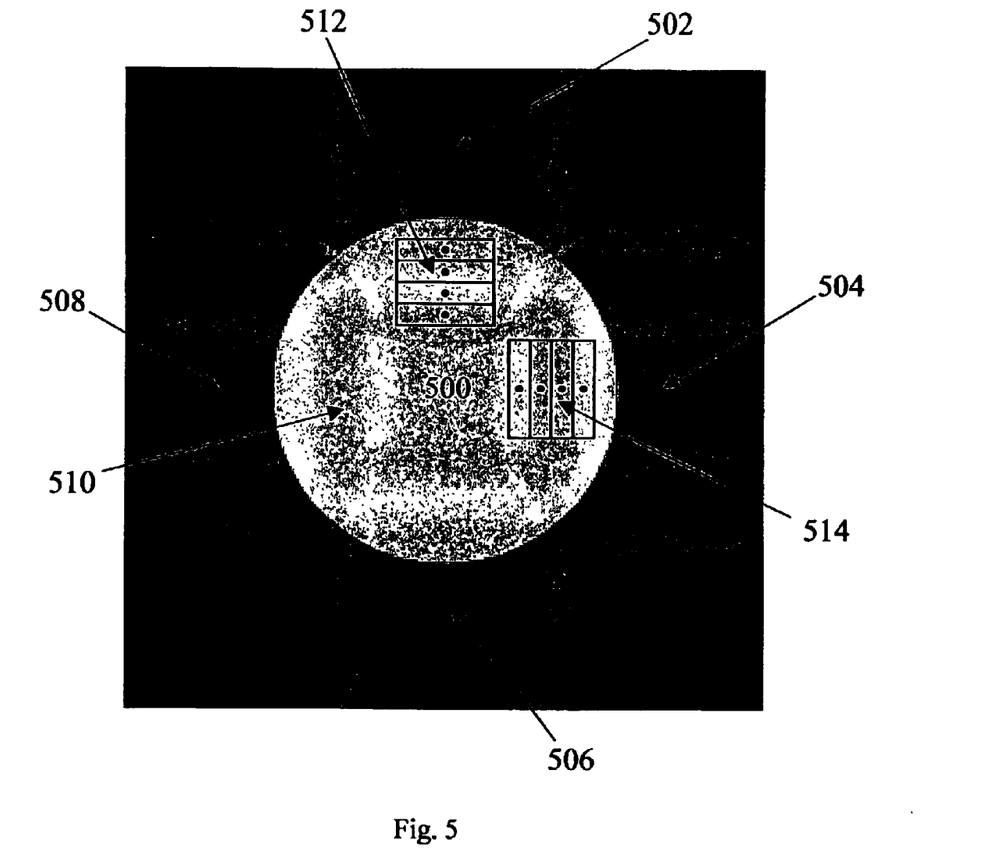
FIG. 5 is illustrated as a black and white photograph showing the distributed intensity pattern of light on detectors within the lateral shear interferometer of FIG. 2.

FIG. 5 illustrates an enlarged depiction of the image of the lateral shear interferometer aperture on the focal plane. The central disk 500 is the higher intensity zero order image of the primary lens 200, having 56.3% of the light entering the subaperture of the lateral shear interferometer less any optical losses. The four first order images 502, 504, 506, 508 are positioned at 90° intervals about the zero order image, each with 2.5% of the light relative to light entering the subaperture of the lateral shear spectrometer. Overlapping regions are created where the first order images overlap the zero order image. Within these overlapping regions, the images interfere to make fringes 510 having approximately a 40% modulation in intensity. FIG. 4e is a plot illustrating the modulation of light in the fringes 510 resulting from the overlap of the zero order and first order images. The period of the modulation is inversely proportional to the amount of defocus of light from the primary lens 200 relative to the grating 204. Thus, by controlling the spacing between the lens 200 and the grating 204, a full period of modulation may be created within the fringe of the zero order image and any first order image.

The phase of the modulation in the fringes 510 is used to measure the beam tilt. Detector elements 512, 514 are disposed within the fringes to detect the modulation of light. Preferably four detector elements 512, 514 are disposed in at least two fringe areas lying along orthogonal axes. Additional detector elements or as few as three detector elements may be used in each fringe sampled. Four detector elements in each fringe sampled provide redundancy over the standard three detector elements normally practiced in shearing interferometry and allow an accurate estimate of the phase of interference in the fringes in both the x and y direction. The change of the phase of interference in the fringes is proportional to the change in tilt of the light input into the lateral shear interferometer. The phase of interference in the fringes varies by 360 degrees when the spot focused on the grating 204 shifts by a full grating period.

The following example illustrates how design parameters of a wavefront sensor may be appropriately chosen in order to test an optical system. In particular, this example focuses on calculations relating to only a single lateral shear interferometer within the wavefront sensor. Those skilled in the art will recognize that the example is easily translated to an array of lateral shear interferometers to determine the tilt of an entire wavefront of light in an optical system undergoing tests.

Initially, the basic parameters of size of the sub-aperture and the power and wavelength of light used are chosen. For purposes of this example, the optical system to be tested is assumed to have a 2 meter aperture. The light source chosen has a wavelength, λ, in the near infrared band at 0.85 μm and has an output power of 5 milliwatts. The diameter of the sub-aperture, D, is chosen to be 7 cm with a focusing lens having an equal diameter and a focal length, F, of 90 cm. Based upon these chosen parameters, the power, P, of light from the light source received by each sub-aperture of the wavefront sensor is approximately 6 μwatts.

After selecting the wavelength of the light source, the size of the sub-aperture, and the focal length of the focusing lens, the grating period may be chosen. The period of the grating effects how much overlap, or shear, occurs between the different order images on the detector. Preferably, the shear is selected as approximately ⅔ of a sub-aperture diameter, however, other shear values may also be used. The preferred shear may be obtained by selecting a grating period, p, for which λ/p equals ⅔ of the tangent of the cone angle for light focused onto the grating. Thus, the grating period for this example is approximated by $$p = \frac{3\lambda \cdot F}{2D} = 16.4 \text{ μm}.$$

The next parameter chosen is the reimaging focal length of the piano-convex lens. This focal length is chosen so that an appropriately sized image of the sub-aperture of the linear shear interferometer is created on the detector. The goal is to size the image so that the desired number of detector elements fall within the overlap regions. The image preferably has a diameter of about 4–5 millimeters on the detector, creating an overlap region that is approximately ⅓ of the image size along a major axis of the zero order image. This image and overlap region size is a reasonable size for a silicon-based detector and also simplifies alignment of the image with the detector elements. To produce an image of this size, a plano-convex lens is chosen with a focal length, F', of 6 cm. The resulting zero order image has a diameter, $d_0$, of approximately 4.67 mm because the size of the zero order image is the product of the focal length of the plano-convex lens and the cone angle for light focused onto the grating. The overlap region thus has a size of approximately 1.55 mm along the major axes of the zero order image.

The intensity of light incident upon the detector is dependent upon the transmission of the primary and plano-optical lenses and the grating efficiency. For purposes of this example, the combined transmission rate of the primary and piano-optical lenses, τ, is assumed to be 80%. As indicated above, the grating has an efficiency, $eff_0$, of 56.3% for the zero order image and an efficiency, $eff_1$, of 2.5% for each first order image. In the overlap regions, also referred to herein as the fringes or fringe regions, the apparent efficiency of the grating is the sum of the efficiencies for the zero and first order images.

A modulation factor in the fringes is also determined for the fringe regions. The modulation factor multiplies the signal-to-noise-ratio and is therefore a factor determining the performance of the lateral shear interferometer. The definition for modulation is the difference in intensity of light between the peak and the minimum divided by the sum of the peak and the minimum in the fringes as the spot of light moves across one period of the grating. Since the grating amplitudes multiply the input light amplitude to give the amplitude on the focal plane, they add and subtract for constructive and destructive interference, and then get squared to convert them from amplitude to intensity. Thus, the modulation factor, γ, is given by the following equation:

$$\gamma = \frac{\left((eff_0)^{\frac{1}{2}} + (eff_1)^{\frac{1}{2}}\right)^2 - \left((eff_0)^{\frac{1}{2}} - (eff_1)^{\frac{1}{2}}\right)^2}{\left((eff_0)^{\frac{1}{2}} + (eff_1)^{\frac{1}{2}}\right)^2 + \left((eff_0)^{\frac{1}{2}} - (eff_1)^{\frac{1}{2}}\right)^2} \approx 0.40.$$

To continue setting up the lateral shear interferometer, the detector is positioned at the desired distance, 6 cm as indicated above, from the plano-optical lens so that four detector elements are within at least two of the fringes, as shown in FIG. 5. The four detector elements are preferably well within the bounds of the fringes so that precise alignment is not required. Once the detector elements are positioned, however, stability of the alignment is desirable. The modulation period of light in the fringe is selected so that one period is approximately equal to the width of the four detector elements along a major axis of the zero order image. If, for example, a single detector has a width of 0.22 mm and a length of 0.78 mm, then the combined width, $\Delta$, of the four detectors is 0.88 mm, and it is desirable to set the modulation period, $p_f$, of light in the fringe to 0.88 mm to sample an entire modulation period with the four detector elements. As previously indicated, the modulation period of light in the fringe is proportional to the amount of defocus of light from the primary lens 200 relative to the grating 204. The amount of defocus, $\Delta z$, is given by the following equation:

$$\Delta z = \frac{\lambda F^2 \cdot d_0}{p_f D^2(Shr)} \approx 1.11 \text{ mm},$$

where Shr is the desired shear amount of $2/3$ in this example.

With the above parameters determined, the average amount of power received by a single detector element, $P_d$, may be calculated by the following equation:

$$P_d = \frac{P \cdot \tau \cdot (eff_0 + eff_1) A_d}{\pi d_0^2 / 4} \approx 28 \text{ nano Watts},$$

where P is the power of light from the light source and $A_d$ is the area of a single detector element. The amount of power received by each detector element may then be multiplied by the responsivity of the detector element and the integration time and divided by the charge of an electron to arrive at the total signal in photoelectrons. For purposes of this example, the responsivity, $\eta$, of a silicon based detector is assumed to be 0.35 Amp/Watt and the measurement time, $\Delta t$, is assumed to be 0.5 milliseconds. The responsivity and measurement time may vary depending upon the type of detector used and the measurement bandwidth required. Thus, the average number of photoelectrons, $N_{ph}$, is $3.3 \times 10^7$ photoelectrons measured per sample time by each detector element in this example.

The total noise of the resulting signal measurement is the root sum square of the shot noise and the readout noise. The total signal divided by this total noise gives the signal-to-noise ratio, SNR, and allows an estimate of performance to be calculated. The SNR is calculated as an average over a full cycle. Such an approach is appropriate because measurements from all four detector elements are used to calculate the fringe phase along each axis of the zero order image. For purposes of this example, the detector readout noise, $N_d$, is assumed to be 3000 photoelectrons. The SNR of each detector element is thus $$SNR_d = \frac{N}{\sqrt{N_{ph} + (N_d)^2}} \approx 5090.$$

Because the total number of detector elements, $N_{det}$, is four in each fringe region, the total signal-to-noise ratio, $SNR_{tot}$, of the detector within each fringe region is given by the following equation:

$$SNR_{tot} = \gamma \cdot SNR_d \cdot (N_{det})^{\frac{1}{2}} \approx 4070,$$

where $\gamma$ is the signal modulation factor determined previously.

Fringe measuring systems have a root mean square (RMS) accuracy in radians given by $2^{1/2}/SNR_{tot}$. This RMS formula is standard for shear interferometers and has been well validated experimentally. Thus, the phase accuracy, $\sigma_\phi$, of a single measurement using the lateral shear interferometer in this example is approximately $3.5 \times 10^{-4}$ radians. This result may be scaled to determine the RMS accuracy of the tilt measurement along one axis using the following equation:

$$\sigma_t = \left(\frac{3\lambda}{2D}\right) \cdot \left(\frac{\sigma_\phi}{2\pi}\right) \approx 1.0 \text{ nanoradians}.$$

Thus, each lateral shear interferometer of the wavefront sensor described herein can achieve a noise level of around 1 nanoradian RMS using conventional detectors and sources. The primary reason for this high performance is that a lateral shear interferometer measures the tilt angle modulo an angle equal to the wavelength divided by the shear distance, which is set at $2/3$ of the sub-aperture diameter in this example. Thus, with a 7 cm sub-aperture, the tilt angle is measured modulo $\lambda/(D \cdot Shr)$ radians, which is 18 microradians in this example. Therefore, in lateral shear interferometers for which the above guidelines are used to select the parameters, a signal to noise ratio of approximately 2000 or more places the $RMS_{tilt}$ noise in the low nanoradian range.

Those skilled in the art will recognize that the wavefront aberration measuring system of FIG. 2 works well when the spot position on the grating varies by less than a single grating period. When the spot position does vary by more than a single grating period, the system of FIG. 2 cannot differentiate between spot positions that differ by a full grating period. The lateral shear interferometer 122 illustrated in FIG. 6 includes a coarse position sensor 208 that is optically coupled to the focused light from the primary lens 200 via a beam splitter 210. The coarse position sensor 208 generates a signal based upon the spot position from the primary lens 200, thus allowing differentiation in spot positions that vary by greater than a full grating period. The data acquisition system receives the signal from the coarse position sensor 208 and generates an integer value to indicate any spot position shift greater than a full the grating period. Thus, for a tilt measurement of 7.137 microradians, the actual tilt angle is the product of this value and an integer multiple of $\lambda/(D*Shr)$.

Figure 6:
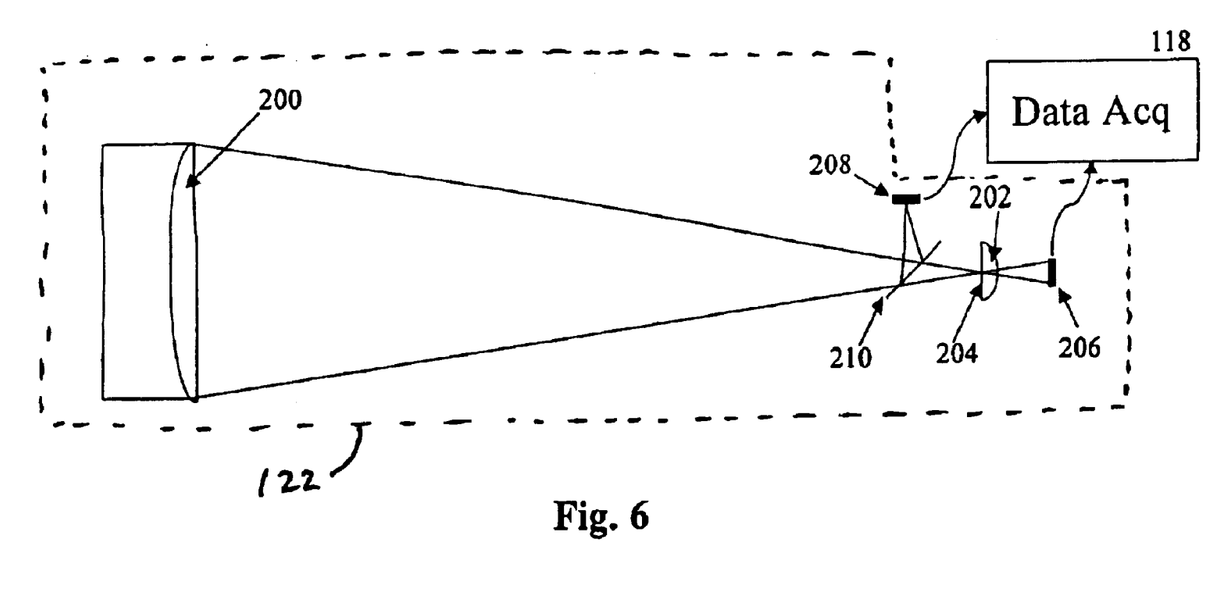
FIG. 6 is a schematic illustration of a lateral shear interferometer that includes a coarse position sensor.

By placing the beam splitter 210 in the path of light within the lateral shear interferometer, those skilled in the art will recognize that the total amount of light incident upon the detector 206 is decreased by the amount of light directed towards the coarse position sensor. For example, if the beam splitter transmits light at a rate of 50% towards the grating, then the power received by the detector 206 will decrease to approximately 14 nanoWatts. However, such a reduction in power translates to an $RMS_{tilt}$ noise of approximately 1.5 nanoradians, a value which still provides high performance measurements.

The coarse position sensor 208 may comprise a position sensitive detector (PSD), also sometimes referred to as a photopot, as PSD's generate signals which vary fairly linearly with the x/y position of an incident spot. By employing a PSD, the number of grating periods the spot has shifted, and thus the integer multiple of the tilt measurement referred to above, may be determined. The PSD preferably measures the spot position to an absolute RMS accuracy of at least ½ of the grating period, and more preferably to an absolute RMS accuracy of at least ¼ of the grating period, and even more preferably to an absolute RMS accuracy of at least ⅛ of the grating period. As the absolute RMS accuracy of the PSD decreases in size, the likelihood of determining the correct grating period shift increases.

Like the detector used with the LSI, the RMS accuracy of the position measurement along one axis of PSD may be determined. For example, if the PSD employed has a field of view of 5 milliradians, then the entire field of view covers approximately 278 grating periods if each grating period is approximately 18 microradians. With such a PSD, an accuracy of ⅛ of the grating period is approximately equivalent to an accuracy of ½₂₀₀ of the field of view. Those skilled in the art will recognize that the RMS error, $\sigma_{coarse}$, of the PSD is given by the following equation:

$$\sigma_{coarse} = \frac{FOV}{2 \cdot SNR_{coarse}},$$

where $SNR_{coarse}$ is the signal-to-noise ratio of all four outputs of the PSD. Thus, if the $\sigma_{coarse}$ is to be better than ⅛ of the grating period, then $SNR_{coarse}$ must be approximately 1100 or greater. The calculation of $SNR_{coarse}$ is similar to the calculation of $SNR_d$ for the detector in each lateral shear interferometer. The power of light incident upon the PSD is approximately 3 $\mu$W, or the equivalent of approximately $3.6 \times 10^9$ photoelectrons in the sample time. Those skilled in the art will recognize that the $SNR_{coarse}$ requirement of 1100 is easily achieved with such a signal.

Dynamic Wavefront Measurements

For many applications absolute measurements are not required. As long as the sampling rate is fast enough so that the beam tilt never moves more than about ⅓ of a grating period between samples, then the motion can be tracked continuously over many cycles. For a wavefront sensor designed to measure dynamic disturbances, the lateral shear interferometer alone is sufficient since the average value of each time sequence of tilt measurements will have its mean value subtracted in the processing. One can use this data to obtain spatial modes across the full aperture, power spectral densities (PSDs), and covariant spectral densities (CSDs). The manner in which such information is determined is well known to those skilled in the art.

The time history of phase readings across multiple cycles may be continuized using the following algorithm. If $P_J$ is the time sequence of phase measurements in cycles, then the missing integer portion may be added by assuming that the first lateral shear interferometer measurement is in the 0–1 range and tracking the cycle shifts with the following equation which adds in the integer portion to each subsequent measurement, J+1, starting at J=0 and running consecutively through the entire time history:

$$P_{J+1}=P_{J+1}+NINT(P_J-P_{J+1}),$$

where NINT(x) is a function that provides the nearest integer of the argument x.

Using the above equation, if $P_{200}=29.377$ after continuizing and $P_{201}=0.4078$, then this equation will reset $P_{201}$ to $P_{201}=29.4078$. Also if $P_{200}=29.941$ and $P_{201}=0.1162$, then this equation will reset $P_{201}$ to $P_{201}=30.1162$. This happens because 30.1162 is closer to 29.941 than is 29.1162 and is thus statistically a more likely correct answer.

Spatially Smooth Wavefront Measurements

For many test applications the wavefront aberrations to be measured are known to be spatially smooth. Thus a 2 meter diameter aperture manufactured for 0.2 waves RMS error will probably not have any tilt more extreme than ±0.2 waves in 5% of the diameter. This maximum angle is only 1.3 microradians and is less than 10% of the 18 microradian dynamic range of an LSI sensor. Thus, for this and similar uses, the LSI does not require a coarse sensor.

Even more powerful than this test condition, spatial continuity may be used to extend the effective dynamic range of an LSI sensor as long as the change in tilt between adjacent subapertures is never larger than about ⅓ of the LSI grating period. If the change in tilt between adjacent subapertures is this small, then the spatial changes may be tracked continuously over many cycles. Thus, where such spatial continuity is present, the LSI does not require a coarse sensor.

The phase readings across multiple subapertures within any one frame may be continuized using the following algorithm. If $P_{J,K}$ is the phase measurement in cycles of the subaperture of identified by the index (J,K), then the missing integer portion may be added to the phase reading by assuming that one reference subaperture is in the 0–1 range and tracking the cycle shifts across the other subapertures. The one reference subaperture may be arbitrarily chosen. The following equation may be used to add in the integer portion to each measurement J+1,K assuming the absolute phase at subaperture (J,K), relative to the reference subaperture, has already been determined:

$$P_{J+1,K}=P_{J+1,K}+NINT(P_{J,K}-P_{J+1,K}),$$

where NINT(x) is a function that provides the nearest integer of the argument x.

This equation may be used to determine the integer potion for any one subaperture in any direction from a subaperture that for which the absolute phase has been determined. Thus a subaperture close to the center primary aperture may be chosen as the reference subaperture, and the phase continuized in all directions from that point to the outer portion of the primary aperture. As long as the aperture is connected by sufficiently smooth subaperture tilts, this process will continuize the phase data across the full aperture.

LSI Calibration

The above-described wavefront sensor assumes that the lateral shear interferometers of each subaperture have been calibrated so that when comparisons of the tilt measurements between subapertures are performed, the comparisons provide a meaningful and accurate results. Seven different types of calibration are preferably performed on the wavefront sensor:

1. electro-optic calibration of the fine sensor;
   2. optical calibration of the fine sensor;
   3. gain calibration of the fine sensor;
   4. rotation calibration of the fine sensor;
   5. electronic zero calibration of the coarse sensor;
   6. field calibration of the coarse sensor; and
   7. boresight calibration of the combined sensor.

Electro-optic calibration of the fine sensor is performed to ensure the precision of the fringe phase estimation. There are 16 pixels per subaperture if each of the four fringe areas are sampled. Each pixel is calibrated in DC bias and linearity. This is a very standard type of sensor processing. All light is blocked to get the zero input values, which are then subtracted from all subsequent data. Next, a series of known intensities are input to get linearity. These data are often fit with polynomial interpolation to get a formula converting electronic signal to input intensity. The calibration process determines the polynomial coefficients, which may be different for each pixel. The nonlinearity is usually regarded as nearly constant in time and can often be measured before final installation in the sensor box assembly. Some sensors such as silicon photodiodes are known to be so linear that linearity calibration is not usually required. The zero offset can drift with time due to temperature swings and so is typically measured shortly before operation by turning off the source and gathering several frames of data.

Optical calibration of the fine sensor is performed so that the relative intensity, modulation, and phase offset of each pixel may be accurately determined. The process is to input a smoothly tilting beam to each subaperture, perhaps at a 45 degree orientation to the x/y shear directions so that both x and y tilts are generated simultaneously. This allows both x and y sensors to be calibrated simultaneously. Each sensor sees a smoothly varying sinusoidal intensity pattern with time. That pattern is truncated to the nearest integer number of cycles and Fourier transformed. The largest non-DC peak of the transform is the tilt signal with magnitude M and phase $\phi$. The DC level, $DC_j$, the magnitude $M_j$, and the phase $\phi_j$ of each pixel signal j is recorded and used to compute noise optimized complex weights which are applied to the later data to estimate the fringe phase for each frame of data.

The phase estimation weights are calculated using the following three equations for the four unknown weights, $Wt_j$:

$$\sum_{j=1}^{4} Wt_j \cdot DC_j = 0 \quad (a)$$

$$\sum_{j=1}^{4} Wt_j \cdot M_j \cdot e^{li\phi_1} = e^{li\phi_2}; \text{ and} \quad (b)$$

$$\sum_{j=1}^{4} (|Wt_j|)^2 \text{ is minimized} \quad (c)$$

The solutions to the above equations use LaGrange multipliers, which are well known to those skilled in the art, and the error metric E shown in the following equation:

$$E = \sum_{j=1}^{4} (|Wt_j|)^2 - \mu \cdot \sum_{j=1}^{4} Wt_j \cdot DC_j - \nu \cdot \left( \sum_{j=1}^{4} Wt_j \cdot M_j \cdot e^{li\phi_1} - e^{li\phi_2} \right). \quad (d)$$

The solution to the unknown weights may thus be determined by:

$$Wt_k = \frac{ -\left( \sum_{j=1}^{4} DC_j \cdot M_j \cdot e^{-li\cdot\phi_j} \right) \cdot e^{li\cdot\phi_2} \cdot DC_k + \left[ \sum_{j=1}^{4} (DC_j)^2 \right] \cdot e^{li(\phi_2-\phi_k)} \cdot M_k }{ \left[ \sum_{j=1}^{4} (DC_j)^2 \right] \cdot \left[ \sum_{j=1}^{4} (M_j)^2 \right] - \left( \sum_{j=1}^{4} DC_j \cdot M_j \cdot e^{-li\cdot\phi_j} \right)^2 }. \quad (e)$$

The purpose of the above weight equations is to sum weights times the signals from the four pixels that are sampling one fringe. The result is a complex number whose phase is the phase of the fringe. This is a normal sort of four-bin processing often used for interferometers. In equation (e) above, the optimized weight is determined for each fringe. In equation (d) above, the error metric uses the LaGrange multipliers $\mu$ and $\nu$. Equation (a) above is the weight requirement that rejects the DC level and equation (b) above is the weight requirement that determines the proper phase from the AC portion of the signal. When equation (c) above is at a minimum, then this weight requirement minimizes the impact of RMS noise on the LSI measurement. Assuming the noise is uniform and uncorrelated (e.g., white noise), this last condition simply means that the weights are chosen so that the sum of their squares with the impact of noise is minimized.

Gain calibration is the next step. The LSI does not measure tilt directly, it measures phase of an interference pattern in cycles. One cycle of phase corresponds to a particular amount of external tilt (in radians) depending upon the focal length of the lens, the amount of defocus, and the period of the grating. These parameters may vary somewhat from subaperture to subaperture, so each subaperture must be calibrated separately in each axis to determine the multiplicative factor relating its phase measurement to external tilt at the entrance lens.

The gain calibration consists of inputting a known sweep in x and/or y tilt and dividing the known tilt change with the measured phase shift in cycles. This scale factor is then stored for each axis and each subaperture.

Rotation calibration of the fine sensor is performed because the grating and sensor in each subaperture may not have been placed at the same angle relative to the gratings and sensors of the other subapertures. Thus, the gratings and sensors of each subaperture are likely to have a slight relative rotation. This means that each subaperture has its own definition of x and y. In order to combine the data meaningfully from all the subapertures together, the data must be derotated.

The rotation calibration may be accomplished by illuminating the entire focal plane at once and tilt the beam along one axis at a time. Each subaperture is likely to have different amounts of x and y response. Typically if one is moving the beam in the nominal x direction, then all the x sensors have nearly the same response since the error in the x direction is a cosine term based on the rotation. For this reason, the x direction error between subapertures is often negligible. However, the response in the y direction is linear relative to the rotation and therefore is easily observed.

As an example, suppose that under nominal x tilt, the x sensor of subaperture A sees its fringe move 112.3774 fringes while the y sensor sees its fringes move 1.2317 fringes. The rotation of the sensor is given by arctan(−1.2317/112.3774), and the sensor is rotated 0.6280 degrees clockwise. Since this is being done simultaneously for all subapertures, the relative rotation of each subaperture may be accurately determined. Typically, the average of all the sensors is defined as the zero rotation point and each sensor's rotation is calculated as the deviation from the average.

Electronic calibration of the coarse sensor is performed by recording the signal levels without any illumination and subtracting them from all later data. This zero calibration is usually updated shortly before a new data set is taken since temperature drifts cause it to vary with time.

Field calibration or linearity calibration of the coarse sensor is used to map the nonlinearity of the photopot over its entire useful range. The basic principle is to use the nearly perfect linearity of the fine sensor (here the LSI) to calibrate the coarse sensor.

A simple field calibration process may be performed by illuminating each subaperture with a beam that moves smoothly in a spiral, a raster pattern, or any other scan pattern which samples the entire photopot range at the desired spatial resolution. The outputs of the LSI are continuously recorded, and the scanning is done slowly enough that the LSI data does not change by more than ¼ of a fringe from frame to frame. This way two-pi changes in fringe phase can be resolved by time continuity and a very precise and linear time history of the motion can be recorded.

Simultaneous with the LSI data, the coarse sensor data is also recorded. A sampling of many points are selected over the entire field of view and a best-least-squares polynomial is found which transforms the coarse sensor data to match the LSI data. This general type of scanning process is commonly used to calibrate and correct for photopot distortion.

Boresight calibration is the last calibration usually performed and is required only when absolute wavefront measurements are desired. Boresight calibration allows tilt measurements in one subaperture to be compared to those in other subapertures so that the entire map of tilts can be used to reconstruct the exact wavefront error to greater accuracy. The use of wavefront gradients to reconstruct a wavefront is well known in the art and is commonly used in connection with Shack-Hartmann wavefront sensors.

A simple way to calibrate this system is to illuminate it with a perfect (or an acceptably imperfect) wavefront. Then all the sensors would record the measurement simultaneously and their subaperture "zeroes" may be locked together, making the system ready for operation.

The problem with this approach is that it requires something as big as the wavefront sensor (perhaps 5–10 meters in diameter) to produce a perfect wavefront. Such a system would cost far more than the test sensor. Accordingly, calibration may be performed by illuminating only a few adjacent subapertures at a time. As few as two adjacent subapearatures may be illuminated simultaneously, but preferably four in a 2×2 pattern are illuminated. Larger arrays of subapertures may also be illuminated. The illuminator is scanned over the full aperture, allowing small groups of subapertures to be calibrated, until the entire array of subapertures has been calibrated. A process similar to the one discussed above for wavefronts is used to reconstruct the boresight calibration of the entire array of subapertures.

Figure 7:
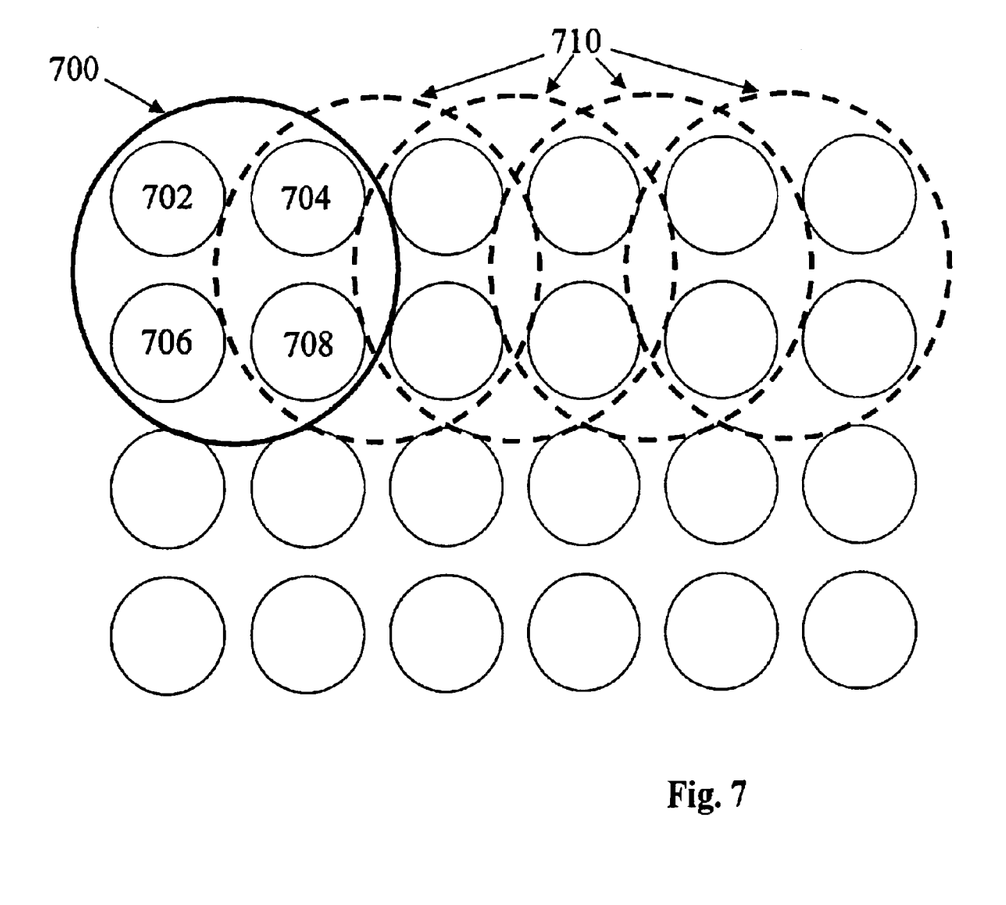
FIG. 7 illustrates the positioning of an illuminator across adjacent subapertures during the process of calibrating a wavefront sensor.

FIG. 7 illustrates the process of calibrating the wavefront sensor. A small telescope 700 illuminates a 2×2 subset of subapertures 702, 704, 706, 708 with a collimated wavefront. The four subapertures measure the tilt of this wavefront simultaneously and the results are compared. By subtracting the measured (x,y) position of the first subaperture 702 from the second subaperture 704, the change in boresight in the x direction is obtained. Similarly by subtracting the measured (x,y) position of the third subaperture 706 from the first subaperture 702, the change in boresight in the y direction is obtained. The boresight change in each direction is determined between all adjacent subapertures. The illuminator is then moved to subsequent positions 710, with similar measurements being made at each position.

With this process repeated over all adjacent subapertures, the x and y differences across the full aperture are obtained. These differences may be noise-optimally integrated in two-dimensions to get an estimate for the full boresight error over the entire aperture. This estimation process is like the process used to reconstruct wavefronts from Shack-Hartmann data and is well known in the field.

It is not always necessary to fully populate an aperture with subapertures. For instance, one might leave a gap for a central obscuration. This will also introduce a gap in the calibration data, but just as wavefront reconstructors easily integrate around gaps in wavefronts, so will this boresight reconstructor because the mathematics is identical.

This boresight calibration process can also be done using only the LSI data when the wavefront tilts are known to lie within the dynamic range of the LSI (18 microradians in the above example) or when the wavefront tilts are spatially smooth enough to be continuized from the LSI data. In practice, this condition of spatial smoothness can allow many waves peak-to-valley aberration sufficient to test almost any good quality optical system. This boresight calibration process may be appropriately adapted to any wavefront sensor that includes a plurality of subapertures.

Sensor Data Processing Flow

Figure 8:
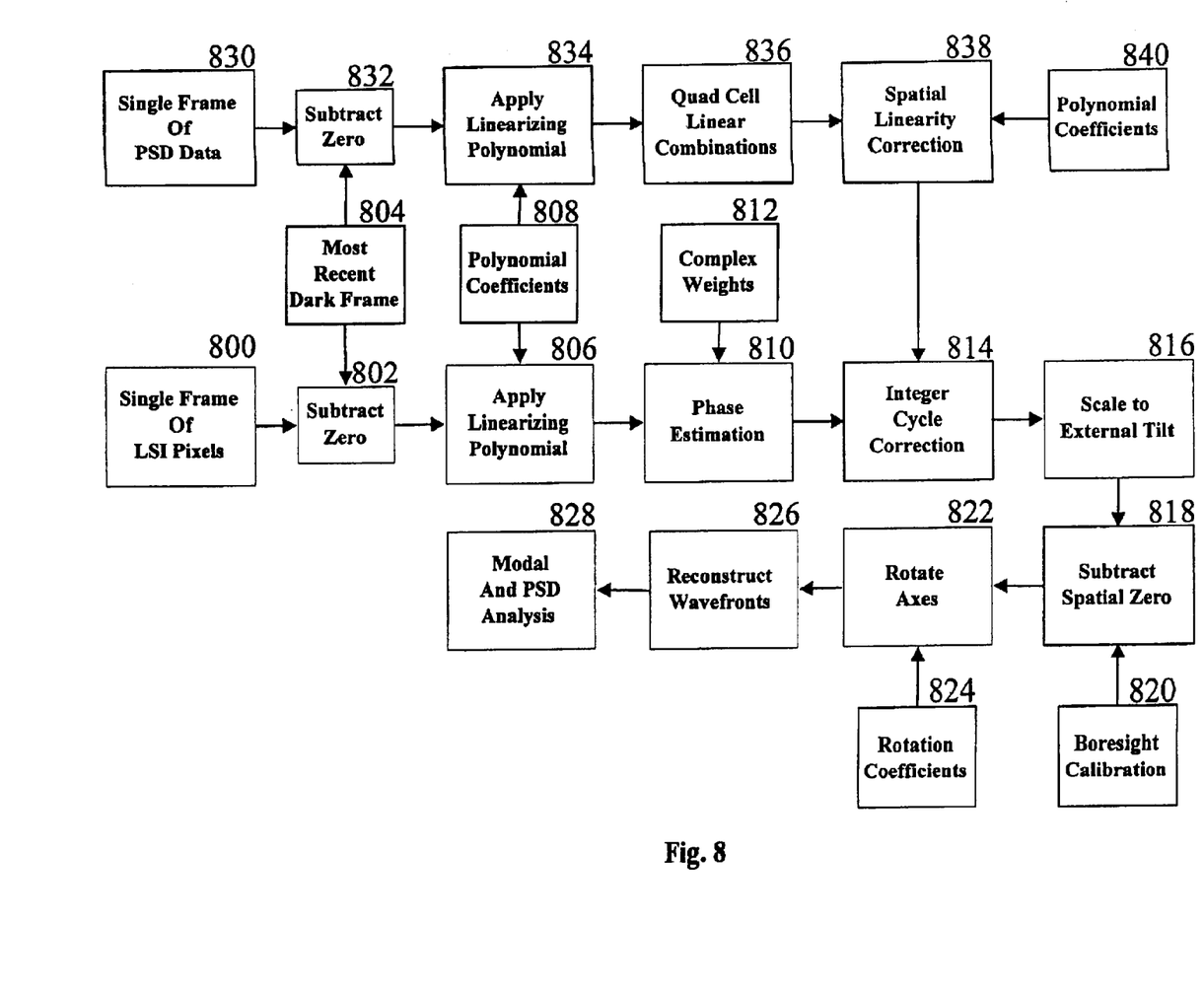
FIG. 8 is a flow chart illustrating the process of analyzing data from a wavefront sensor to determine wavefront aberrations.

FIG. 8 is a flowchart illustrating the data processing that accompanies this wavefront sensor. The processing steps include slight variations for dynamic sensors as compared to absolute wavefront sensors. The calibration data, where used, is also shown.

First, LSI data is obtained 800 that comprises 3 or more digitized pixel intensities for each tilt measurement and is processed a frame at a time. Next, the pixel zero levels are subtracted 802 using the most recent dark frame data 804, which is usually taken shortly before the operational data. The pixel outputs are linearized 806 using the polynomial coefficients 808 from a previous linearity calibration. For many silicon sensors this step is not needed because the sensor is already sufficiently linear. Next, the phase of the wavefront at each subaperture is estimated 810 using the weight requirements 812.

If absolute processing is being performed, the coarse phase estimates are combined 814 with the LSI phase estimates to recover the integer number of cycles. The process of obtaining the coarse phase estimates is further described below. In combining the PSD data with the LSI data, the fringe phase estimate in cycles from the four-bin LSI data for each subaperture, $P_{LSI}$, lies between 0 and 1 because the LSI does not differentiate shifts in the grating period. The phase estimate, $P_{PP}$, for the same axis from the PSD sensor has an integer part and a fractional part, with the fractional part having an accuracy that is limited to ⅛ of the grating period. In contrast the LSI fractional part is accurate to better than 1 part in 4000. By combining the two phase estimates $P_{LSI}$ and $P_{PP}$, the correct integer from the photopot data and the accurate fractional part from the LSI data is sought. A simple formula that accomplishes this is as follows:

$$P = P_{LSI} + NINT(P_{PP} - P_{LSI}),$$

where NINT(x) is a function that provides the nearest integer of the argument x. Thus if $P_{PP}=29.377$ and $P_{LSI}=0.4078$, then the composite P=29.4078. Also if $P_{PP}=29.941$ and $P_{LSI}=0.1162$, then the composite P=30.1162. This happens because 30.1162 is closer to 29.941 than is 29.1162 and is thus statistically a more likely correct answer.

The recovery of the integer portion of the phase error 814 may be accomplished without the use of any coarse sensor data by spatial continuization if the aberrated wavefront is sufficiently smooth as discussed earlier. This combination step may, however, be excluded if dynamic processing is performed.

The phase data is thereafter multiplied 816 by the scaling factor to convert the phase data to external tilt. Following scaling, if absolute processing is performed, the tilt zero for that subaperture is subtracted 818 using boresight calibration data 820. Finally, the data is derotated 822 using the rotation coefficients 824 so that all the x,y axes are aligned.

The step of derotation 822 completes the formation of subaperture tilt data. After that there are many different and standard options for reconstructing 826 the data into modes and maps of wavefront error. These modes or maps can then be time analyzed to create power spectral densities (PSDs) and correlations (CSDs) or movies of optical transfer function (OTF). The type of processing used is determined by the type of test conducted and the particular application.

The coarse photopot processing follows a similar chain. Each single frame of data 830 has its zero intensity signal levels subtracted 832 using the most recent dark frame 804. As with the LSI sensor, a dark frame is usually taken shortly before the tests are conducted. Then the sensor signals are linearized 834 using the polynomial coefficients 808.

The standard quad cell linear combinations are taken from each set of four photopot outputs. If S1, S2, S3 and S4 represent the four digitized photopot outputs, then the two data combinations used are:

Axis $1=(S1+S2-S3-S4)/(S1+S2+S3+S4)$; and

Axis $2=(-S1+S2+S3-S4)/(S1+S2+S3+S4)$.

These two quantities are usually fairly linear in the position of the spot on the focal plane, which is quite linear in the subaperture tilt to be measured. The nonlinearities, however, are usually large enough to need correction, and such linear correction is performed 838 using the polynomial coefficients 840. The coarse estimates (in cycles of fringe motion) are then combined with the LSI data to provide the integer number of cycles the LSI data is missing.

Thus, a wavefront sensor and a method of calibrating a wavefront sensor are disclosed. While embodiments of this invention have been shown and described, it would be apparent to those skilled in the art that many more modifications are possible without departing from the inventive concepts herein. For example, more complex arrangements of lenses, gratings, sensors, and processing may be envisaged for a wavefront sensor following these same design principles, and additional optics such as mirrors and prisms may be added to redirect, reduce, or magnify light within the LSI. The invention, therefore, is not to be restricted except in the spirit of the following claims.

What is claimed is:

1. A wavefront tilt measurement system for measuring the wavefront tilt of light passing through a transmitting or receiving optical system, the optical system including a primary aperture and internal optical elements defining an optical system focal plane, the measurement system comprising:
   a light source emitting light from the optical system focal plane towards the internal optical elements such that light from the light source emerges from the primary aperture;
   a plurality of tilt sensors, wherein:
      each tilt sensor is disposed adjacent to at least one other tilt sensor and adjacent to the primary aperture to receive light emerging from the primary aperture;
      each tilt sensor includes a sensor focal plane and a plurality of detector elements, each detector element being disposed within one of plurality of overlapping regions of zero and first order images of light emerging from the primary aperture generated by the tilt sensor at the sensor focal plane; and
      each tilt sensor comprises:
         a primary sensor lens disposed to receive light emerging from the primary aperture;
         a reimaging sensor lens optically coupled to the primary sensor lens;
         a grating optically disposed between the primary sensor lens and the reimaging sensor lens, wherein the primary sensor lens focuses light onto the grating, the grating generates the overlapping regions, and the reimaging sensor lens images the overlapping regions at the sensor focal plane.

2. The measurement system of claim 1, wherein the reimaging sensor lens is a plano-convex lens and the grating is integral to the planar side of the plano-convex lens.

3. The measurement system of claim 1, wherein the grating has an average transmission of incident light greater than 60%.

4. The measurement system of claim 1, wherein the grating has an inverse cross-hatched pattern.

5. The measurement system of claim 1, wherein the distance between center points of the primary sensor lenses in adjacent tilt sensors is such that ambiguities in the wavefront tilt measurement over a full period of the grating may be resolved by spatial continuity.

6. A wavefront tilt measurement system for measuring the wavefront tilt of light passing through a transmitting or receiving optical system, the optical system including a primary aperture and internal optical elements defining an optical system focal plane, the measurement system comprising:
   a light source emitting light from the optical system focal plane towards the internal optical elements such that light from the light source emerges from the primary aperture;
   a plurality of tilt sensors, wherein each tilt sensor is disposed adjacent to at least one other tilt sensor and adjacent to the primary aperture to receive light emerging from the primary aperture, and wherein each tilt sensor includes a sensor focal plane and a plurality of detector elements, each detector element being disposed within one of a plurality of overlapping regions of zero and first order images of light emerging from the primary aperture generated by the tilt sensor at the sensor focal plane; and
   one or more coarse position sensors, wherein each coarse position sensor is optically coupled to one of the tilt sensors to receive light entering the tilt sensor from the primary aperture.

7. The measurement system of claim 6, wherein the coarse position sensor provides a rough wavefront tilt measurement that is used to resolve ambiguities in at least the wavefront tilt measurement provided by the tilt sensor to which the coarse position sensor is optically coupled.

8. A wavefront tilt measurement system for measuring the wavefront tilt of light passing through a transmitting or receiving optical system, the optical system including a primary aperture and internal optical elements defining an optical system focal plane, the measurement system comprising:
   a light source emitting light from the optical system focal plane towards the internal optical elements such that light from the light source emerges from the primary aperture; and
   a wavefront sensor disposed adjacent the primary aperture to receive light from the light source, the wavefront sensor comprising a plurality of coarse position sensors and a plurality of tilt sensors, wherein each tilt sensor and each coarse position sensor receives light emerging from the primary aperture.

9. The measurement system of claim 8, wherein at least some of the tilt sensors include beam splitters, and each the beam splitter optically couples one of the coarse position sensors to one of the tilt sensors such that the optical position sensor receives light emerging from the primary aperture.

10. The measurement system of claim 9, wherein each coarse position sensor provides a rough wavefront tilt measurement that is used to resolve ambiguities in at least the wavefront tilt measurement provided by the tilt sensor to which each coarse position sensor is optically coupled.

11. The measurement system of claim 8, wherein each tilt sensor comprises a lateral shear interferometer.

12. The measurement system of claim 8, wherein each tilt sensor includes a sensor focal plane and a plurality of detector elements and each detector element is disposed within one of a plurality of overlapping regions of zero and first order images of light from the light source generated by the tilt sensor at the sensor focal plane.

13. The measurement system of claim 12, wherein each tilt sensor comprises
 a primary sensor lens disposed to receive light emerging from the primary aperture;
 a reimaging sensor lens optically coupled to the primary sensor lens;
 a grating optically disposed between the primary sensor lens and the reimaging sensor lens, wherein the primary sensor lens focuses light onto the grating, the grating generates the overlapping regions, and the reimaging sensor lens images the overlapping regions at the sensor focal plane.

14. The measurement system of claim 13, wherein the reimaging sensor lens is a plano-convex lens and the grating is integral to the planar side of the plano-convex lens.

15. The measurement system of claim 13, wherein the grating has an average transmission of incident light greater than 60%.

16. The measurement system of claim 13, wherein the grating has an inverse cross-hatched pattern.

17. The measurement system of claim 13, wherein the distance between center points of the primary sensor lenses in adjacent tilt sensors is such that ambiguities in the wavefront tilt measurement over a full period of the grating may be resolved by spatial continuity.

18. The measurement system of claim 8, wherein the light source emits coherent light.

19. A wavefront tilt measurement method for measuring the wavefront tilt of light passing through a transmitting or receiving optical system, the optical system including a primary aperture and internal optical elements defining an optical system focal plane, the method comprising:
 directing light emitted from a light source at the focal plane of the optical system towards the internal optical elements such that light from the light source emerges from the primary aperture;
 receiving light emerging from the primary aperture with a plurality of tilt sensors, wherein each tilt sensor is disclosed adjacent to at least one other tilt sensor and adjacent to the primary aperture, and wherein each tilt sensor includes a sensor focal plane and a plurality of detectors elements;
 generating at the sensor focal plane a plurality of overlapping regions of zero order and first order images of light emerging from the primary aperture, wherein each detector element is disposed within one of the overlapping regions;
 measuring the intensity of light incident upon the detector elements;
 determining the wavefront tilt of light emerging from the primary aperture based upon the intensity measurements;
 simultaneously measuring the wavefront tilt of light emerging from the primary aperture using a plurality of coarse position sensors; and
 resolving ambiguities in the wavefront tilt measurement of each tilt sensor using the wavefront tilt measurement of one of the coarse position sensors.

20. The method of claim 19, wherein generating at the sensor focal plane a plurality of overlapping regions of zero order and first order images of light emerging from the primary aperture includes generating the overlapping regions of zero order and first order images of light by passing light emerging from the primary aperture through a grating.

21. The method of claim 19 further comprising repeatedly measuring the wavefront tilt to determine dynamic changes in the wavefront tilt over time.

22. A wavefront tilt measurement method for measuring the wavefront tilt of light passing through a transmitting or receiving optical system, the optical system including a primary aperture and internal optical elements defining an optical system focal plane, the method comprising:
 directing light emitted from a light source at the focal plane of the optical system towards the internal optical elements such that light from the light source emerges from the primary aperture;
 receiving light emerging from the primary aperture with a plurality of tilt sensors, wherein each tilt sensor is disposed adjacent to at least one other tilt sensor and adjacent to the primary aperture, and wherein each tilt sensor includes a sensor focal plane and a plurality of detector elements;
 generating at the sensor focal plane a plurality of overlapping regions of zero order and first order images of light by passing light emerging from the primary aperture through a grating, wherein the grating has an inverse cross-hatched pattern, and wherein each detector element is disposed within one of the overlapping regions;
 measuring the intensity of light incident upon the detector elements; and
 determining the wavefront tilt of light emerging from the primary aperture based upon the intensity measurements.

* * * * *